Sept. 7, 1948.  J. R. MOORE  2,448,543
CIRCUIT FOR PERIODICALLY GENERATING OSCILLATIONS
Filed Nov. 28, 1942

INVENTOR
JAMES R. MOORE
BY William D. Hall
ATTORNEY

Patented Sept. 7, 1948

2,448,543

UNITED STATES PATENT OFFICE 2,448,543

CIRCUIT FOR PERIODICALLY GENERATING OSCILLATIONS

James R. Moore, Rumson, N. J., assignor to the United States of America as represented by the Secretary of War Application November 28, 1942, Serial No. 467,271

4 Claims. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to electronic circuits and more particularly to circuits for periodically generating electrical oscillations of constant or varying amplitude.

It is the main object of my present invention to provide means of the general character indicated which enables the substantially instantaneous production of electrical oscillations and also the substantially instantaneous cessation of such oscillations.

It is the further object of my present invention to provide a circuit whereby the amplitude of the oscillations produced can be maintained at a constant level or can be made to increase or decrease in a given time interval at the will of the operator.

The oscillations produced by means of the present invention are of particular value in the production of an accurate calibrating wave such as is described in my copending application entitled "Time wave generating system," Serial Number 467,262, filed of even date herewith, which wave may be employed, for example, for the calibration of a pulse-echo range determining system such as is described in another of my copending applications entitled "Method and means for determining range," Serial Number 467,261, also filed of even date herewith.

Other objects and advantages of the present invention will readily occur to those skilled in the art to which the same relates as the detailed description thereof progresses.

In the accompanying drawings.

Figure 1:
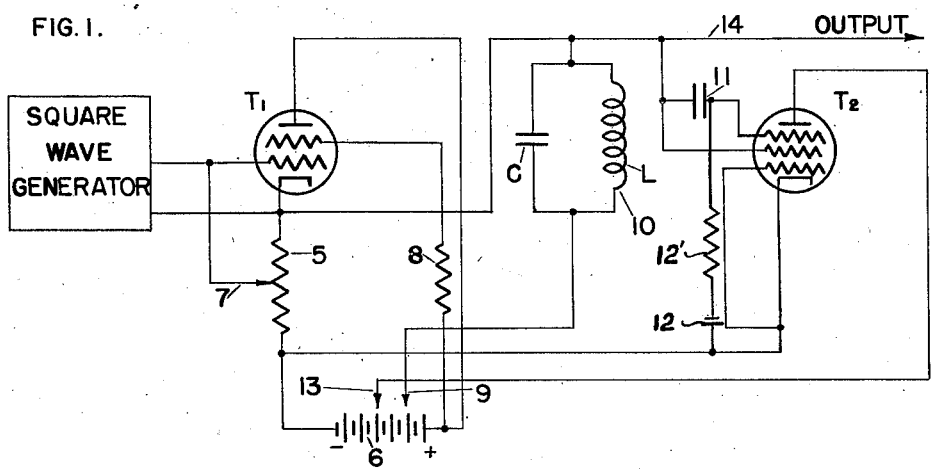
Figure 1 is a schematic diagram of an oscillating circuit assembled in accordance with the principles of the present invention.

Referring more in detail to my present invention, with particular reference to the preferred form thereof illustrated in Figure 1 of the drawings, I initially provide a source of square wave voltage. While this voltage may be produced by any appropriate generator, I prefer that it comprise a portion of the output of a keyer constituting a component of a pulse-echo system for target detection. The frequency of this voltage will depend, in a well known manner, upon the maximum effective range of the particular target detecting system.

The square wave thus obtained is applied to the control grid of a trigger tube $T_1$. Such tube preferably comprises a tetrode in which the cathode is connected through a high resistance potentiometer 5 to the negative terminal of a source 6 of d.-c. voltage, the control grid is biased negatively through the adjustable contact arm 7 of the potentiometer, the screen grid is connected through a resistance 8 to the positive terminal of the source 6 of d.-c. voltage, and the plate is directly connected to said source of d.-c. voltage. By reason of the character of the voltage fed to the tube $T_1$ said tube becomes alternately conducting and non-conducting.

Connected between the cathode of the tube $T_1$ and the positive side of the source 6 of d.-c. voltage, at a point 9, which is at a lower potential than is connected to the plate of said tube, is a tank circuit 10 comprising the parallel inductance L and capacitance C, the resonant frequency of the tank circuit being a multiple, not necessarily integral, of the frequency of the square wave voltage applied to the grid of the tube $T_1$. This arrangement is such that when the tube $T_1$ is conducting it shunts the tank circuit and presents a low impedance path for the current therein so that the tank circuit substantially instantaneously ceases to oscillate, whereas, as said tube becomes non-conducting, the tank circuit is shock excited and substantially instantaneously commences to oscillate.

Figure 2:
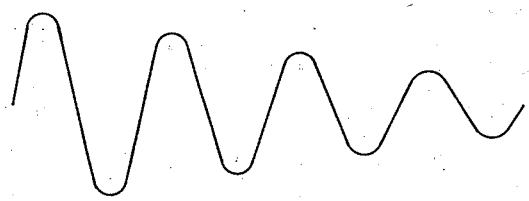
Figure 2 is an oscillogram of a damped sine wave such as is normally produced by a shock excited inductance-capacitance tank circuit.

These oscillations, shown in Figure 2 of the drawings, are normally damped and if it is desired to maintain the amplitude at a constant level, it is necessary to provide a means to make up for the losses in the tank circuit.

Figure 3:
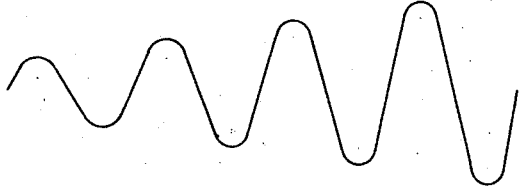
Figure 3 is an oscillogram of a sine wave such as is normally produced by a vacuum tube oscillator.

For this purpose, I provide a vacuum tube oscillator, preferably having a negative resistance characteristic such as is shown on page 1221 of Proceedings I. R. E., volume 23, 1935. The normal output of such an oscillator is a sine wave of gradually increasing amplitude as shown in Figure 3 of the drawings.

This oscillator preferably comprises a pentode tube $T_2$ the screen grid of which is directly receptive of the oscillating output of the tank circuit 10 and the suppressor grid of which is also receptive of said output through the capacitance 11. The cathode of this tube is connected to the negative terminal of the source 6 of d.-c. voltage and the control grid may, if desired, be biased negatively with respect to the cathode by any well known means. The tube obtains its negative resistance characteristic by reason of its plate being connected at the point 13 on the source 6 of d.-c. voltage which is at a lower potential than the point 9 to which the screen grid is connected through the tank circuit 10, and by reason of its suppressor grid being biased negatively with respect to its cathode through the bias battery 12 and resistance 12'. The output of the oscillator is obtained through a conductor 14 connected into the screen grid circuit.

Figure 4:
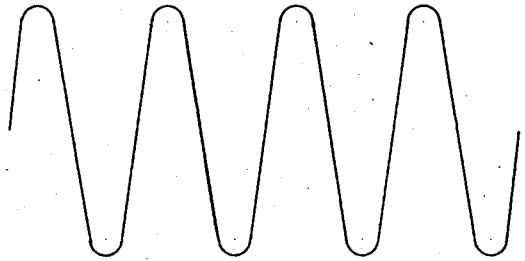
Figure 4 is an oscillogram of a sine wave resulting from combining the waves of Figure 2 and Figure 3, for example, by the means of the circuit of Figure 1.

It is to be noted that the output of the tank circuit 10 and the output of the oscillator tube T₂ are in phase and if the amplitude of the former decreases at the same rate as the amplitude of the latter increases, combining both results in a constant amplitude sine wave, such as is shown in Figure 4 of the drawings. It follows that by altering the resistance of the tank circuit or the oscillating vacuum tube circuit the rate of damping of the former or building up of the latter can be varied and any desired variations in the amplitude level of the combined waves can thus be obtained.

A constant amplitude sine wave obtained as above is particularly useful for controlling the generation of a calibrating wave of square configuration and for this purpose, the circuit herein shown and described may be readily substituted for the oscillation producing portion of the time wave generating circuit described in my copending application first above identified.

It will be noted from all of the foregoing that I have provided a circuit for the periodic generation of very stable sine wave oscillations, the commencement and cessation of said oscillations being substantially instantaneous and the amplitude thereof being constant or variable at will.

While I have set forth a preferred form of my invention it is to be clearly understood that I do not wish to be limited to the exact details or the specific application herein shown and described for purpose of illustration only, inasmuch as changes therein may be made without the exercise of invention and within the scope of the claims hereto appended.

I claim:

1. Apparatus for producing electrical oscillations comprising, a resonant circuit, means for periodically shunting said resonant circuit with a variable impedance whereby said resonant circuit is caused alternately to oscillate and to cease oscillating, and an electronic circuit having a negative resistance characteristic coupled to said resonant circuit for maintaining the output thereof at predetermined amplitude levels during the oscillating periods.

2. Apparatus for producing electrical oscillations comprising, a resonant circuit, means for alternately exciting said resonant circuit and shunting the same with a low impedance whereby said resonant circuit is caused alternately to oscillate and to cease oscillating, and an electronic circuit having a negative resistance characteristic coupled to said resonant circuit for maintaining the output thereof at predetermined amplitude levels during the oscillating periods.

3. Apparatus for producing electrical oscillations comprising, a resonant circuit, an alternately conducting and non-conducting electronic circuit for periodically shunting said resonant circuit with a variable impedance whereby said resonant circuit is caused alternately to oscillate and to cease oscillating, and an electronic circuit having a negative resistance characteristic coupled to said resonant circuit for maintaining the output thereof at predetermined amplitude levels during the oscillating periods.

4. Apparatus for producing electrical oscillations comprising, a resonant circuit, an alternately conducting and non-conducting electronic circuit for alternately exciting said resonant circuit and shunting the same with a low impedance whereby said resonant circuit is caused alternately to oscillate and to cease oscillating, and an electronic circuit having a negative resistance characteristic coupled to said resonant circuit for maintaining the output thereof at predetermined amplitude levels during the oscillating periods.

JAMES R. MOORE.

REFERENCES CITED

The following references are of record in the file of this patent:

UNITED STATES PATENTS

| Number | Name | Date |
|---|---|---|
| 1,773,556 | Von Arco | Aug. 19, 1930 |
| 1,908,249 | Hund | May 9, 1933 |
| 2,029,488 | Koch | Feb. 4, 1936 |
| 2,092,098 | Turner | Sept. 7, 1937 |
| 2,130,272 | Ford | Sept. 13, 1938 |
| 2,244,003 | Eaglesfield | June 3, 1941 |
| 2,274,347 | Rust | Feb. 24, 1942 |
| 2,364,756 | Roberts | Dec. 12, 1944 |
| 2,370,685 | Rea | Mar. 6, 1945 |

OTHER REFERENCES

Pro. I. R. E., vol. 27, No. 2, February 1939, pages 88–94.